United States Patent
Tsai et al.

(10) Patent No.: US 11,427,184 B2
(45) Date of Patent: Aug. 30, 2022

(54) BREADTH FIRST SEARCH-DEPTH FIRST SEARCH THREE DIMENSIONAL RAPID EXPLORING RANDOM TREE SEARCH WITH PHYSICAL CONSTRAINTS

(71) Applicant: Black Sesame International Holding Limited, Santa Clara, CA (US)

(72) Inventors: Mengting Tsai, Santa Clara, CA (US); xiao Sun, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 254 days.

(21) Appl. No.: 16/815,620

(22) Filed: Mar. 11, 2020

(65) Prior Publication Data
US 2021/0284130 A1    Sep. 16, 2021

(51) Int. Cl.
*B60W 30/045*    (2012.01)
*B60W 30/095*    (2012.01)
*G08G 1/056*    (2006.01)

(52) U.S. Cl.
CPC ........ *B60W 30/045* (2013.01); *B60W 30/095* (2013.01); *G08G 1/056* (2013.01)

(58) Field of Classification Search
CPC ............. B60W 30/045; B60W 30/095; B60W 2520/10; B60W 30/0953; B60W 30/04; B60W 30/02; G08G 1/056; G06N 3/04
USPC ......................................................... 701/72
See application file for complete search history.

(56) References Cited

U.S. PATENT DOCUMENTS

| | | | | |
|---|---|---|---|---|
| 5,177,685 A | * | 1/1993 | Davis | B60R 16/0373 340/988 |
| 5,479,323 A | * | 12/1995 | Shibata | B60Q 1/122 362/420 |
| 5,555,503 A | * | 9/1996 | Kyrtsos | G01S 19/47 701/518 |
| 5,629,855 A | * | 5/1997 | Kyrtsos | G01S 19/11 701/300 |
| 8,532,862 B2 | * | 9/2013 | Neff | G05D 1/0246 701/25 |
| 8,874,267 B1 | * | 10/2014 | Dolgov | B60W 30/08 700/255 |
| 8,954,260 B2 | * | 2/2015 | Gandhi | G08G 1/166 701/117 |
| 11,218,626 B2 | * | 1/2022 | Wang | H04N 5/2258 |
| 2003/0018428 A1 | * | 1/2003 | Knockeart | G08G 1/096861 342/357.31 |
| 2004/0257244 A1 | * | 12/2004 | Kubota | B62D 15/0285 340/932.2 |

(Continued)

FOREIGN PATENT DOCUMENTS

WO  WO-2010050344 A1 *  5/2010  ......... B60K 31/0075

*Primary Examiner* — B M M Hannan
(74) *Attorney, Agent, or Firm* — Timothy T. Wang; Ni, Wang & Massand, PLLC

(57) ABSTRACT

An example operation includes one or more of, determining an initial position and at least one vehicle constraint, predetermining a distance to a new position, determining a minimum turn radius based on the at least one vehicle constraint, selecting a vehicle turn radius that is at least as large as the minimum turn radius, determining a candidate position based on the at least one vehicle constraint and the vehicle turn radius, verifying whether the candidate position is valid with respect to the new position and converting the new position to the candidate position.

20 Claims, 4 Drawing Sheets

(56) References Cited

U.S. PATENT DOCUMENTS

| | | | | |
|---|---|---|---|---|
| 2005/0216181 A1* | 9/2005 | Estkowski | ............ | G05D 1/0212 |
| | | | | 701/411 |
| 2009/0313566 A1* | 12/2009 | Vian | ....................... | G06T 15/00 |
| | | | | 715/765 |
| 2010/0066515 A1* | 3/2010 | Shimazaki | ................ | G06T 7/73 |
| | | | | 340/435 |
| 2011/0307175 A1* | 12/2011 | Gandhi | .................. | G08G 1/166 |
| | | | | 701/301 |
| 2015/0003087 A1* | 1/2015 | Futamura | ............... | B60Q 9/008 |
| | | | | 362/466 |
| 2017/0146999 A1* | 5/2017 | Cherepinsky | ........ | G05D 1/0214 |
| 2018/0056970 A1* | 3/2018 | Tokoro | .................. | B60W 10/20 |
| 2018/0162412 A1* | 6/2018 | Gao | .................... | B60W 30/143 |
| 2018/0178784 A1* | 6/2018 | Ohta | .................... | B60W 30/095 |
| 2018/0203454 A1* | 7/2018 | Aoki | ................. | B60W 50/0097 |
| 2018/0239015 A1* | 8/2018 | Nishida | ................ | B62D 15/025 |
| 2019/0039591 A1* | 2/2019 | Raveendran | ...... | B60W 30/0953 |
| 2019/0111874 A1* | 4/2019 | Harada | ................. | G01S 13/726 |
| 2020/0342760 A1* | 10/2020 | Vassilovski | .............. | H04W 4/40 |
| 2021/0046923 A1* | 2/2021 | Olson | .................... | B60W 30/09 |
| 2021/0046926 A1* | 2/2021 | Olson | .................. | G05D 1/0088 |
| 2021/0048817 A1* | 2/2021 | Olson | .................. | B60W 30/09 |
| 2021/0163068 A1* | 6/2021 | Zhu | ........................ | G05D 1/021 |

* cited by examiner

US 11,427,184 B2

BREADTH FIRST SEARCH-DEPTH FIRST SEARCH THREE DIMENSIONAL RAPID EXPLORING RANDOM TREE SEARCH WITH PHYSICAL CONSTRAINTS

BACKGROUND

Technical Field

The instant disclosure is related to artificial neural networks and specifically providing a fused breadth first search, depth first search in three dimensions with rapid exploring random tree search having physical constraints.

Background

Currently, rapid exploring random tree (RRT) based searching randomly generates new states and expands a tree if the transition between a new state and the closest state on the tree is valid; this is an inefficient search method. In situations where the timeliness of a solution is important, a more efficient solution is sought. This disclosure describes a method that fuses a breadth first search (BFS), a depth first search (DFS) and a rapid exploring random tree (RRT) search. The described method randomly selects a state from a grown tree having favored states, and expands the tree based on physical constraints of a vehicle as opposed to the current method of generating new states randomly. This approach may provide a solution to produce a route from one point to another at an accelerated pace.

SUMMARY

An example method of path planning, comprising at least one of, determining an initial position and at least one vehicle constraint, predetermining a distance to a new position, determining a minimum turn radius based on the at least one vehicle constraint, selecting a vehicle turn radius that is at least as large as the minimum turn radius, determining a candidate position based on the at least one vehicle constraint and the vehicle turn radius, verifying whether the candidate position is valid with respect to the new position and converting the new position to the candidate position.

An example non-transitory computer readable medium comprising instructions, that when read by a processor, cause the processor to perform at least one of, determining an initial position and at least one vehicle constraint, predetermining a distance to a new position, determining a minimum turn radius based on the at least one vehicle constraint, selecting a vehicle turn radius that is at least as large as the minimum turn radius, determining a candidate position based on the at least one vehicle constraint and the vehicle turn radius, verifying whether the candidate position is valid with respect to the new position and converting the new position to the candidate position.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
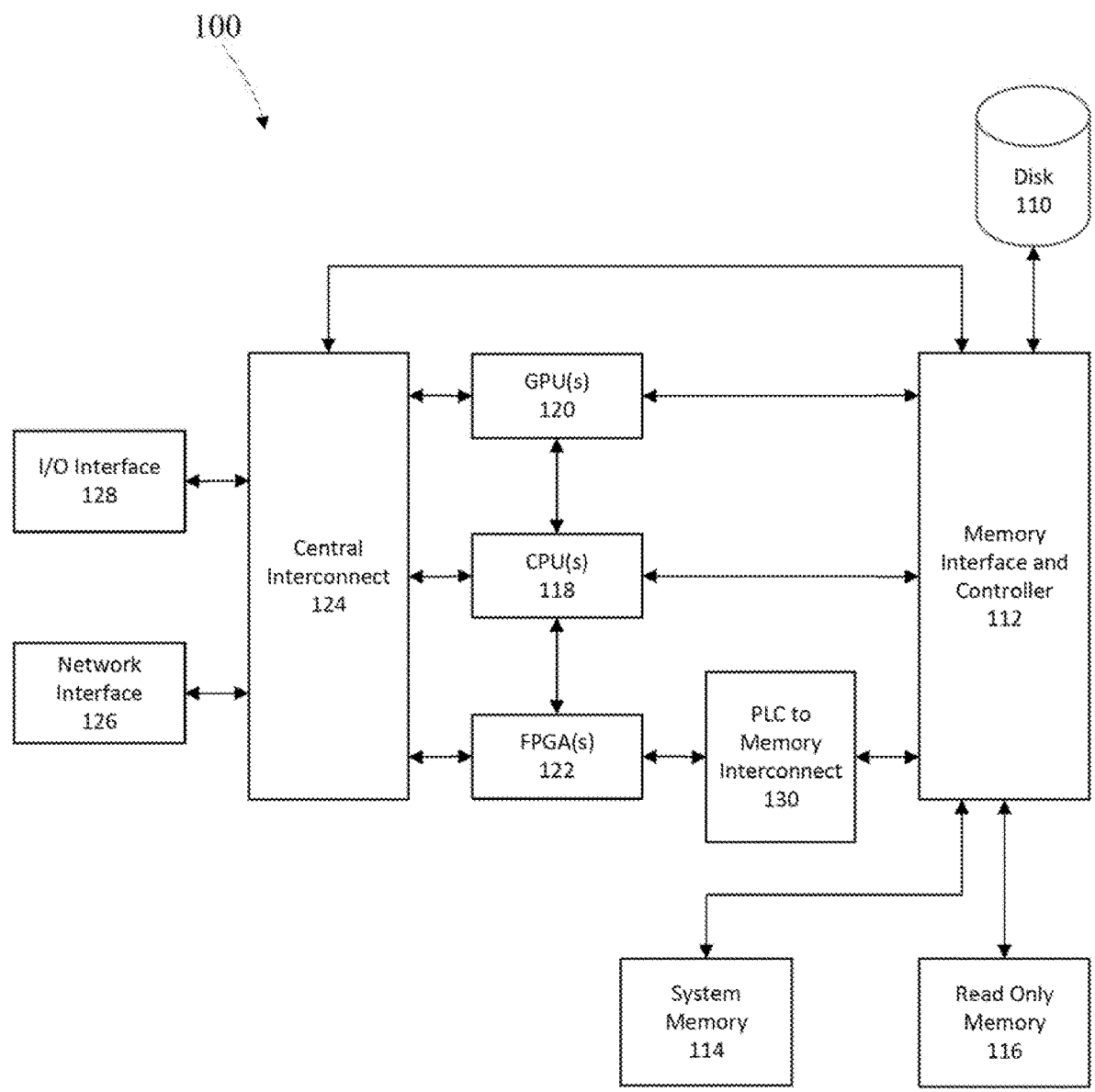
FIG. 1 is a first example system diagram in accordance with one embodiment of the disclosure.

FIG. 1 depicts an example hybrid computational system 100 that may be used to implement neural nets associated with the operation of one or more portions or steps of process 400. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
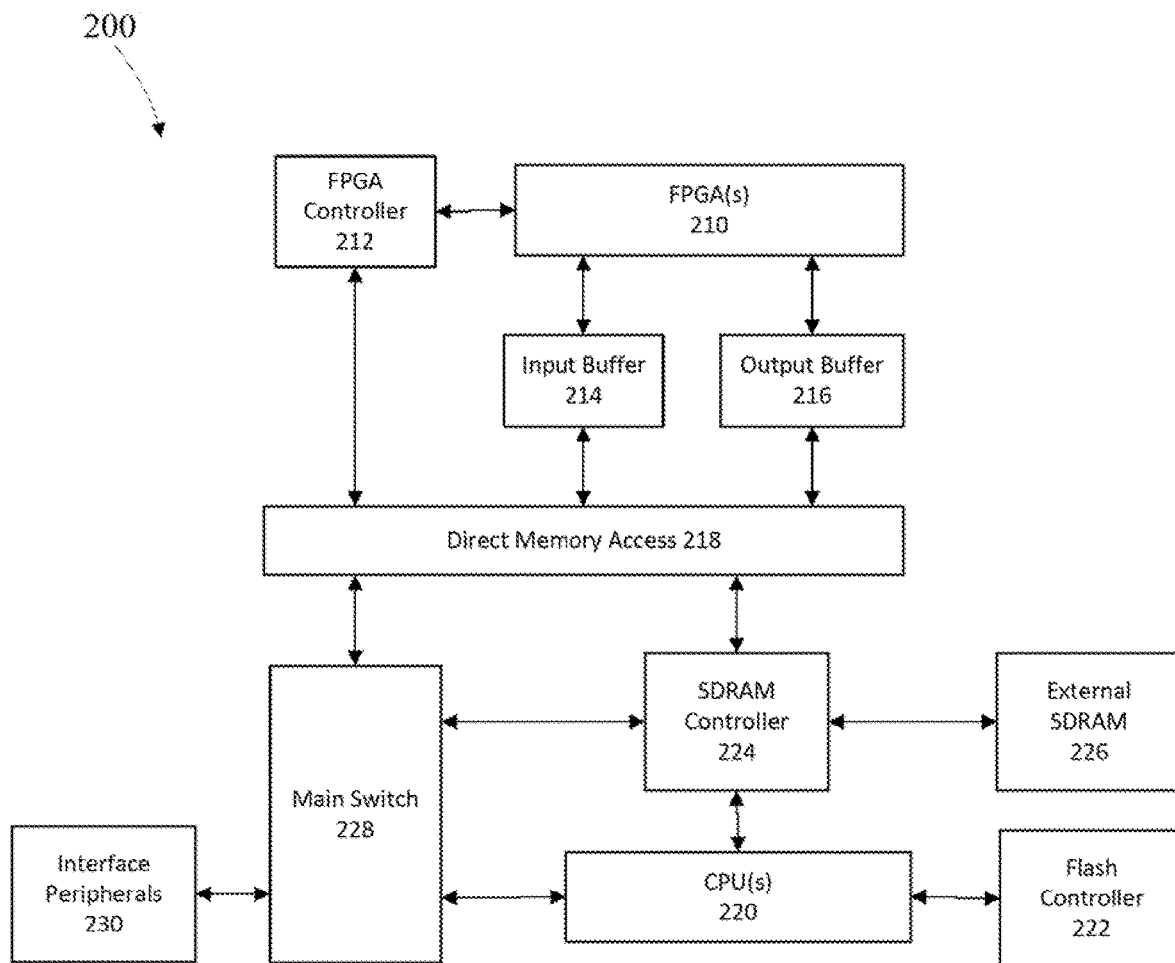
FIG. 2 is a second example system diagram in accordance with one embodiment of the disclosure.

FIG. 2 depicts a second example hybrid computational system 200 that may be used to implement neural nets associated with the operation of one or more portions or steps of process 600. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

The proposed method may provide results in a faster and more efficient manner than previous methods, in part because instead of randomly generating new states and the selection including invalid states, states are selected from a grown tree of known valid states. The described method is flexible and configurable to a vehicle's kinematic constraints. This method utilizes the vehicle's configuration to grow a tree having only valid states. The described method is efficient and fast enough to be executable by the processor within the vehicle, since the method takes car's kinetic constraints into consideration; the path output is selected only from valid states and is executable by the processor within the vehicle.

Unlike traditional RRT search methods that extend the tree randomly, the disclosed method extends the tree utilizing a BFS-DFS hybrid approach. States are randomly selected from a grown tree and from that state, new states are determined based on vehicle constraints.

Because the method generates new valid states, this BFS like feature helps RRT explore in a more efficient way.

A goal state may be utilized as the newly generated state and a determination made as to whether the transition between the new state and the closest state in the tree is valid. If the state is valid, the tree is extended from that state to goal state, which means a path is found.

A state may be selected from the grown tree and a determination made as to whether the transition between this state and the goal state is valid. If the state is valid, the tree may be extended from that state to goal state, indicating that a path has been found.

If a possible route was predetermined, it may be used as a guide for the RRT search. In this way extending the tree is a randomly selected state from the waypoint utilized as the new state. If the transition between the new state and the closest state in the tree is valid, the bias extends the tree in the direction of the guide.

A description for an example method may include, randomly selecting a state from a grown tree in which the random selection has a bias favoring a deeper state, i.e. a state that is farther from the start state. In this way deeper states have a higher probability of selection. Utilizing this DFS like feature, the method focuses on expanding the tree to an unknown area, rather than repeatedly exploring areas closes to start state.

In one example method of determining a new state from a state selected based on a vehicle constraint, the method determines a path planned in three dimensional (3D) states that includes (x, y, pose). Given a car kinetic constraints such as acceleration, velocity and radius of turn, a new state may be determined. In this example method of path planning, the path is started from an initial state. The 3D state includes position (x, y) and heading (z). To determine a new state, a predetermined distance is selected between the new state FIGS. 3, 316, 320 and 324 of vehicle FIGS. 3, 314, 318 and 322 respectively and the initial state of vehicle FIG. 3, 310 which is represented by the dashed circle FIG. 3, 312. If it is assumed that the vehicle is running at a maximum velocity v, the minimum turn radius of the vehicle may be determined. When the minimum turn radius r is known, that sets a valid radius of turn from r to infinity. Given this set of valid radius of turns, a random selection may be made between r and infinity, which is utilized to determine the intercept between the pseudo-random selection FIGS. 3, 316, 320 and 324.

Figure 3:
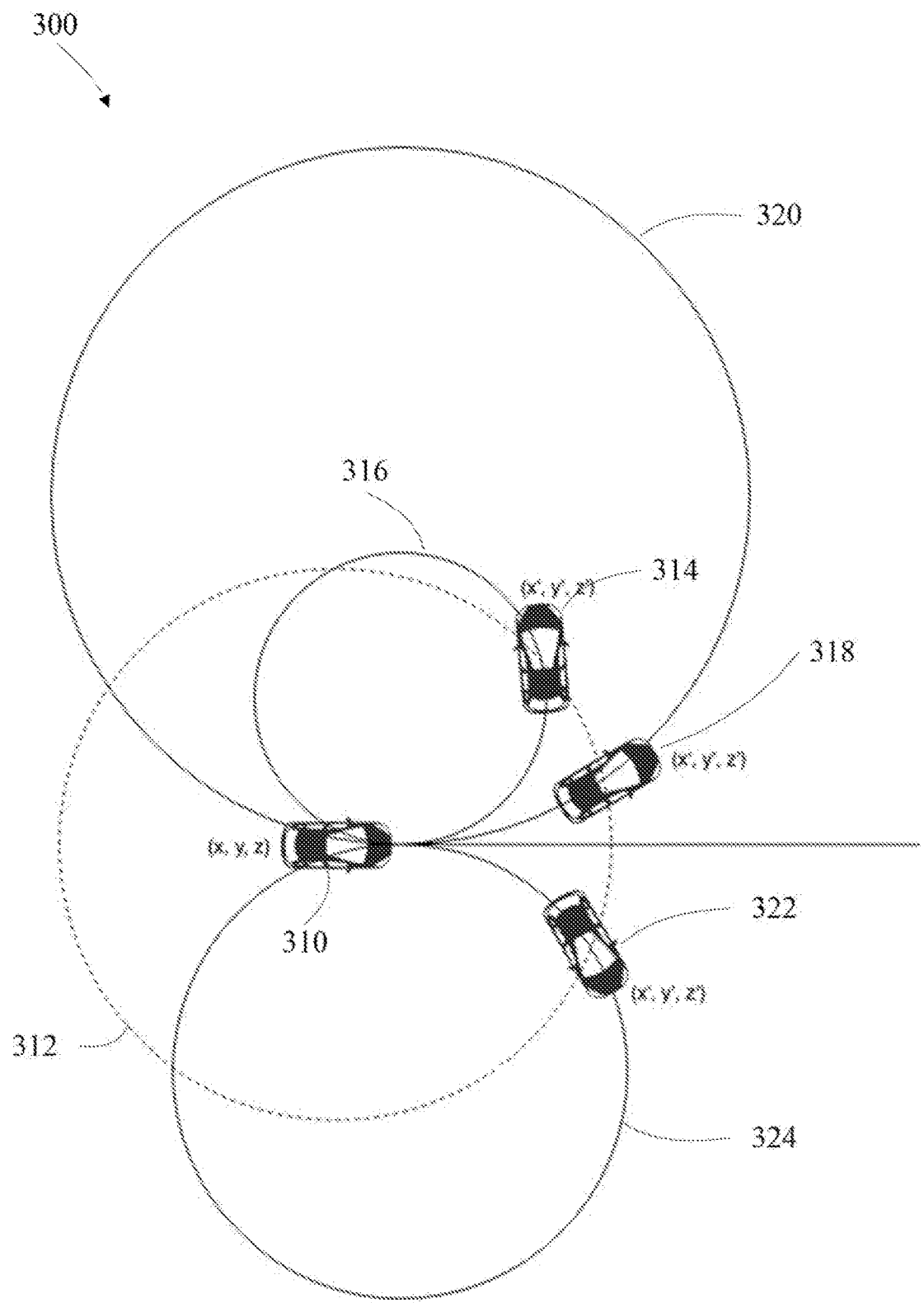
FIG. 3 is a an example overview in accordance with one embodiment of the disclosure.

The intersect of the pseudo-random selection is given by circle FIGS. 3, 316, 320 and 324 and the dashed circle FIG. 3, 312, can be used to determine the new state (x', y', z') with a high confidence that it is a valid state for car to execute.

If no valid new state is, this example method will utilize the vehicle acceleration constraint to slow down and compute a new velocity v', and repeat the method again, since slower velocity corresponds to tighter turn radius. Therefore, once provided with vehicle parameters, such as max velocity, acceleration limit, and a function of current running speed and minimum turn of radius, and the like, the method will generate valid new states.

This method combines the benefits of BFS, DFS, and RRT searches. The method explores toward a random direction with RRT like features, extends the explored area with BFS like features, and goes deep into unknown area with DFS like features. By fusing the space explore methods, a new method is found that outputs correct results in an efficient manner.

Figure 4:
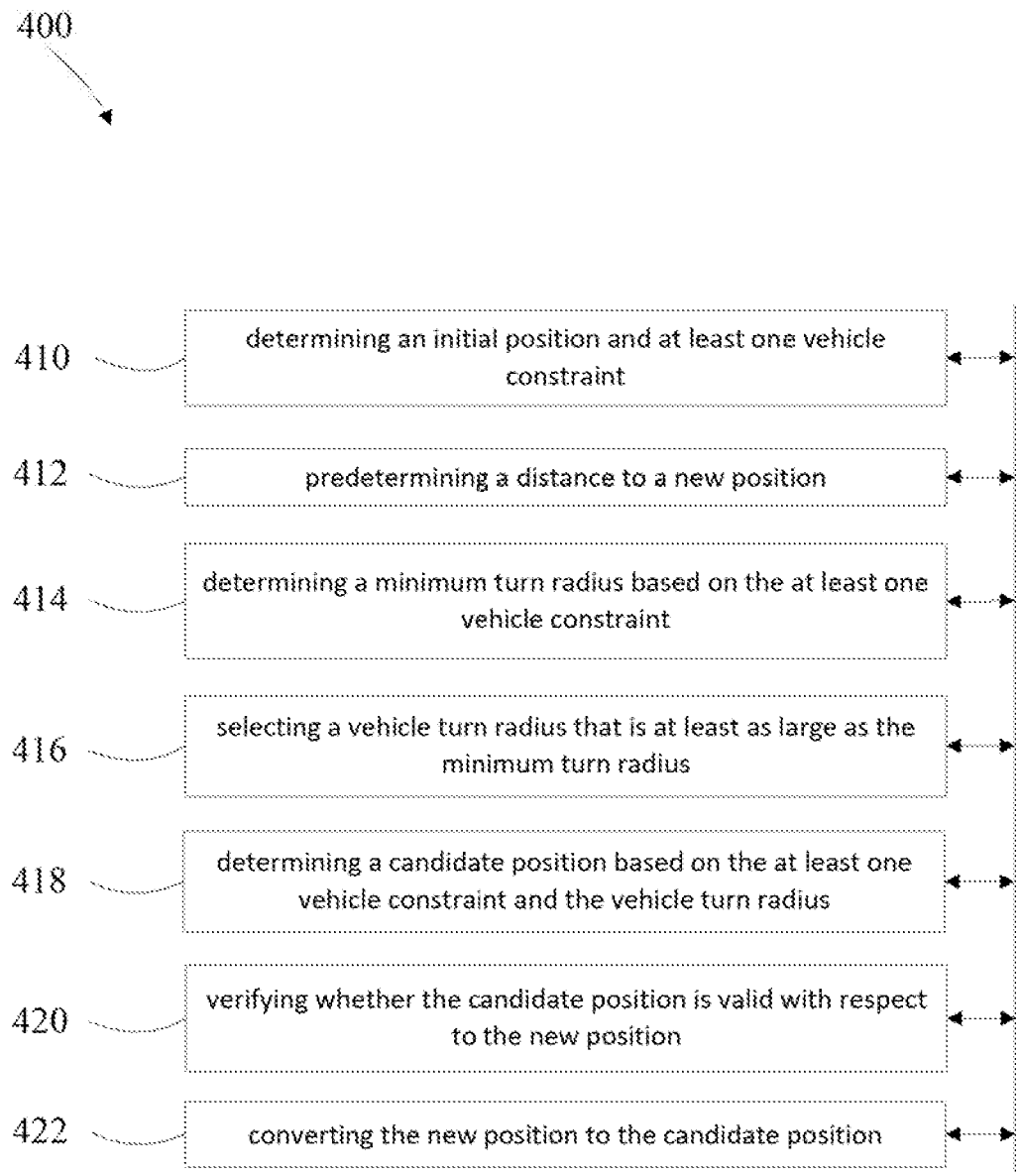
FIG. 4 is an example method in accordance with one embodiment of the disclosure.

FIG. 4 depicts an example method that includes determining 410 an initial position and at least one vehicle constraint, predetermining 412 a distance to a new position and determining 414 a minimum turn radius based on the at least one vehicle constraint. The method also includes selecting 416 a vehicle turn radius that is at least as large as the minimum turn radius, determining 418 a candidate position based on the at least one vehicle constraint and the vehicle turn radius, verifying 420 whether the candidate position is valid with respect to the new position and converting 422 the new position to the candidate position.

The method may also include reducing the at least one vehicle constraint if the new position is not verified as valid. The at least one vehicle constraint may be a vehicle speed and wherein the minimum turn radius is based on the vehicle speed and the at least one vehicle constraint comprises at least one of a maximum velocity and an acceleration limit. The selection of the vehicle turn radius may be pseudo-random and the selection of the vehicle turn radius is weighted towards larger turn radii.

The method may also include reducing a vehicle acceleration to reduce a vehicle speed if the candidate position is not valid, determining a new candidate position based on the reduced vehicle speed, verifying whether the new candidate position is valid with respect to the new position and converting the new position to the new candidate position.

An example non-transitory computer readable medium comprises instructions, that when read by a processor, cause the processor to perform, determining an initial position and at least one vehicle constraint, predetermining a distance to a new position and determining a minimum turn radius based on the at least one vehicle constraint. The processor also performs selecting a vehicle turn radius that is at least as large as the minimum turn radius, determining a candidate position based on the at least one vehicle constraint and the vehicle turn radius, verifying whether the candidate position is valid with respect to the new position and converting the new position to the candidate position.

The processor may also reduce the at least one vehicle constraint if the new position is not verified as valid. The at least one vehicle constraint may be a vehicle speed and wherein the minimum turn radius is based on the vehicle speed and the at least one vehicle constraint comprises at least one of a maximum velocity and an acceleration limit. The selection of the vehicle turn radius may be pseudo-random and the selection of the vehicle turn radius is weighted towards larger turn radii.

The processor may also reduce a vehicle acceleration to reduce a vehicle speed if the candidate position is not valid, determine a new candidate position based on the reduced vehicle speed, verify whether the new candidate position is valid with respect to the new position and convert the new position to the new candidate position.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of path planning, comprising:
   determining an initial position and at least one vehicle constraint;
   predetermining a distance to a new position;
   determining a minimum turn radius based on the at least one vehicle constraint;
   selecting a vehicle turn radius that is at least as large as the minimum turn radius, wherein the vehicle turn radius is selected based on a breadth first search of a known valid turn radius and extended with a depth first search farther away from the known valid turn radius;
   determining a candidate position based on the at least one vehicle constraint and the vehicle turn radius;
   verifying whether the candidate position is valid with respect to the new position; and
   converting the new position to the candidate position.

2. The method of claim 1, further comprising modifying the at least one vehicle constraint when the new position is not verified as valid.

3. The method of claim 1, wherein the at least one vehicle constraint is a vehicle speed and wherein the minimum turn radius is based on the vehicle speed.

4. The method of claim 1, wherein the at least one vehicle constraint comprises at least one of a maximum velocity and an acceleration limit.

5. The method of claim 1, wherein the selection of the vehicle turn radius is randomly larger than the minimum turn radius.

6. The method of claim 1, wherein the selection of the vehicle turn radius is weighted towards larger turn radii.

7. The method of claim 1, further comprising reducing a vehicle acceleration to reduce a vehicle speed when the candidate position is not valid.

8. The method of claim 7, further comprising determining a new candidate position based on the reduced vehicle speed.

9. The method of claim 8, further comprising verifying whether the new candidate position is valid with respect to the new position.

10. The method of claim 9, further comprising converting the new position to the new candidate position.

11. A non-transitory computer readable medium comprising instructions, that when read by a processor, cause the processor to perform:
    determining an initial position and at least one vehicle constraint;
    predetermining a distance to a new position;
    determining a minimum turn radius based on the at least one vehicle constraint;
    selecting a vehicle turn radius that is at least as large as the minimum turn radius, wherein the vehicle turn radius is selected based on a breadth first search of a known valid turn radius and extended with a depth first search farther away from the known valid turn radius;
    determining a candidate position based on the at least one vehicle constraint and the vehicle turn radius;
    verifying whether the candidate position is valid with respect to the new position; and
    converting the new position to the candidate position.

12. The non-transitory computer readable medium of claim 11, further comprising
    instructions that cause the processor to reduce the at least one vehicle constraint when the new position is not verified as valid.

13. The non-transitory computer readable medium of claim 11, wherein the at least one vehicle constraint is a vehicle speed and wherein the minimum turn radius is based on the vehicle speed.

14. The non-transitory computer readable medium of claim 11, wherein the at least one vehicle constraint comprises at least one of a maximum velocity and an acceleration limit.

15. The non-transitory computer readable medium of claim 11, wherein the selection of the vehicle turn radius is randomly larger than the minimum turn radius.

16. The non-transitory computer readable medium of claim 11, wherein the selection of the vehicle turn radius is weighted towards larger turn radii.

17. The non-transitory computer readable medium of claim 11, further comprising instructions that cause the processor to reduce a vehicle acceleration to reduce a vehicle speed when the candidate position is not valid.

18. The non-transitory computer readable medium of claim 17, further comprising instructions that cause the processor to determine a new candidate position based on the reduced vehicle speed.

19. The non-transitory computer readable medium of claim 18, further comprising instructions that cause the processor to verify whether the new candidate position is valid with respect to the new position.

20. The non-transitory computer readable medium of claim 19, further comprising instructions that cause the processor to convert the new position to the new candidate position.

* * * * *